(12) United States Patent
Li et al.

(10) Patent No.: US 8,315,500 B2
(45) Date of Patent: Nov. 20, 2012

(54) METAMATERIAL INCLUSION STRUCTURE AND METHOD

(75) Inventors: Jingjing Li, Palo Alto, CA (US); Shih-Yuan Wang, Palo Alto, CA (US); Wei Wu, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1083 days.

(21) Appl. No.: 12/245,612

(22) Filed: Oct. 3, 2008

(65) Prior Publication Data
US 2010/0086272 A1 Apr. 8, 2010

(51) Int. Cl.
*G02B 6/00* (2006.01)
(52) U.S. Cl. ...................................... 385/147
(58) Field of Classification Search ............ 385/147
See application file for complete search history.

(56) References Cited

U.S. PATENT DOCUMENTS

| | | | |
|---|---|---|---|
| 6,608,811 B1 | 8/2003 | Holden et al. | |
| 6,965,354 B2 * | 11/2005 | Pendry | 343/909 |
| 7,352,941 B2 | 4/2008 | Bratkovski et al. | |
| 7,522,124 B2 * | 4/2009 | Smith et al. | 343/909 |
| 7,580,604 B2 * | 8/2009 | D'Aguanno et al. | 385/129 |
| 7,889,134 B2 * | 2/2011 | McKinzie et al. | 343/700 MS |
| 7,940,228 B1 * | 5/2011 | Buckley | 343/810 |
| 2005/0221128 A1 | 10/2005 | Kochergin | |
| 2007/0014006 A1 | 1/2007 | Tanaka et al. | |
| 2007/0215843 A1 | 9/2007 | Soukoulis et al. | |
| 2008/0102319 A1 * | 5/2008 | Bratkovski et al. | 428/824 |
| 2008/0165079 A1 | 7/2008 | Smith et al. | |
| 2008/0165442 A1 * | 7/2008 | Cai et al. | 359/896 |
| 2010/0131906 A1 * | 5/2010 | Wyland | 716/3 |
| 2010/0134898 A1 * | 6/2010 | Shalaev et al. | 359/665 |
| 2010/0253997 A1 * | 10/2010 | Li | 359/319 |

OTHER PUBLICATIONS

A. Benedetti et al., "Wide band negative magnetic permeability materials (NMPM) with composite metalsemiconductor structures based on the Drude model, and applications to negative-refractive index (NIM)." Optics Express, vol. 15, No. 11, May 14, 2007, pp. 6534-6545.
P.Y. Chen et al., "Synthesis design of artificial magnetic metamaterials using a genetic algorithm," Optics Express, vol. 16, No. 17, Aug. 8, 2008, pp. 12806-2818.
U. K. Chettiar et al., "Negative index metamaterial combining magnetic resonators with metal films," Optics Express, vol. 14, No. 17, Aug. 21, 2006, pp. 7872-7877.
B. Kanté et al., "Engineering resonances in infrared metamaterials," Optics Express, vol. 16, No. 10, Apr. 28, 2008, pp. 6774-6784.
V. M. Shalaev, "Optical negative-index metamaterials," Nature Photonics, vol. 1, Jan. 2007, www.nature.com/naturephotonics, pp. 41-48. S. Zhang et al., "Demonstration of metal—dielectric negative-index metamaterials with improved performance at optical frequencies," J. Opt. Soc. Am. B, vol. 23, No. 3, Mar. 2006, pp. 434-438.
L. Kang et al., "Magnetically tunable negative permeability metamaterial composed by split ring resonators and ferrite rods," Optics Express, vol. 16, No. 12, Jun. 2, 2008, pp. 8825-8834.
S. Linden et al., "Photonic Metamaterials: Magnetism at Optical Frequencies," IEEE Journal of Selected Topics in Quantum Electronics, vol. 12, No. 6, Nov./Dec. 2006, pp. 1097-1105.

* cited by examiner

*Primary Examiner* — Uyen Chau N Le
*Assistant Examiner* — John M Bedtelyon

(57) ABSTRACT

A metamaterial inclusion structure (MIS), a metamaterial and a method of producing an optical magnetic response employ interspersed plasmonic and dielectric materials. The MIS includes first petals of a plasmonic material and second petals of a dielectric material that alternate at a surface and along a periphery of the MIS. The MIS exhibits the magnetic resonance when illuminated by an optical signal at an optical wavelength. The optical signal has a magnetic field component that is parallel with an interface between the first petals and the second petals. The metamaterial includes a plurality of the MIS arranged in an array and provides an optical magnetic susceptibility at the optical wavelength. The method forms the MIS with the alternating petals and includes illuminating the MIS with the optical signal.

20 Claims, 4 Drawing Sheets

METAMATERIAL INCLUSION STRUCTURE AND METHOD

STATEMENT REGARDING FEDERALLY SPONSORED RESEARCH OR DEVELOPMENT

This invention has been made with government support under DARPA Contract No. HR0011-05-3-0002. The government has certain rights in the invention.

CROSS-REFERENCE TO RELATED APPLICATIONS

N/A

BACKGROUND

1. Technical Field

The invention relates to photonics. In particular, the invention relates to metamaterial inclusion structures that provide a magnetic response optical frequencies.

2. Description of Related Art

A metamaterial is a composite material that derives a material property from a combination of its composition and its structure rather than exclusively from its bulk composition. In particular, metamaterials are manmade materials that generally comprise arrays of inclusion structures. The inclusion structures, which are usually much smaller than a wavelength of an excitation signal, act together to produce an aggregate response (or material response) to the excitation signal. For example, metamaterials that exhibit a negative index of refraction (so-called negative index materials (NIMs)), a material property that is not available in natural materials, have been demonstrated. Such metamaterials may be realized by combining a material with negative permittivity $\in$ and a material with negative permeability $\mu$, for example. Metamaterials have a number of intriguing real-world applications including, but not limited to, producing a so-called superlens which may provide resolutions that exceed a diffraction limit at an operational wavelength and even "cloaking devices" that could make an object essentially invisible to incident electromagnetic radiation.

Metamaterials in both the microwave and optical domains have been demonstrated beginning with work by W. E. Kock in the 1940's. Kock developed metal lens antennas and metallic delay lines that, while not described at the time as such, essentially comprised metamaterials. Note that the term 'metamaterial' was first coined in 1999 by R. M. Walser and has been used only more recently to describe composite materials including, but not limited to, those developed by Kock and others prior to the 1990's.

Optical metamaterials have also been demonstrated. Optical metamaterials may be realized by constructing an array of inclusion structures with sub-wavelength dimensions that exhibit a response (i.e., resonance) to one or both of an electric field component and a magnetic field component of an optical excitation signal. A number of examples of optical metamaterials comprising inclusion structures that exhibit relatively strong electric field responses have been reported by N. Engheta, N. Liu et al. and others.

However, producing a strong (or even a weak) response to a magnetic field component of the incident optical signal is more difficult. In particular, unlike the case in the radio frequency (RF) domain, producing a magnetic response with a metamaterial inclusion structure at optical wavelengths is problematic due to various specific characteristics of metals typically used to realize such structures. As such, there is interest in finding means for realizing metamaterial inclusion structures that exhibit a magnetic response or resonance in the optical domain. Such a metamaterial inclusion structure with optical domain magnetic responses may facilitate the production of metamaterials with negative effective permeability, and further, negative indices of refraction at optical frequencies that would satisfy a long felt need.

BRIEF SUMMARY

In some embodiments of the present invention, a metamaterial inclusion structure that supports a magnetic resonance at optical frequencies is provided. The metamaterial inclusion structure comprises a plurality of first petals, the first petals comprising a plasmonic material. The metamaterial inclusion structure further comprises a plurality of second petals, the second petals comprising a dielectric material. The second petals are interspersed with the first petals, such that the second petals alternate with the first petals at a surface and along a periphery of the metamaterial inclusion structure. The metamaterial inclusion structure exhibits the magnetic resonance when illuminated by an optical signal at an optical wavelength. The optical signal has a magnetic field component that is parallel with an interface between the first petals and the second petals.

In other embodiments of the present invention, an optical metamaterial exhibiting an optical magnetic susceptibility is provided. The optical metamaterial comprises a plurality of metamaterial inclusion structures arranged in an array. A metamaterial inclusion structure of the plurality comprises a plurality of first petals, the first petals comprising a plasmonic material that supports a surface plasmon at an optical wavelength. The metamaterial inclusion structure further comprises a plurality of second petals, the second petals comprising a dielectric material. The second petals are interspersed with the first petals such that the first petals and the second petals alternate at a surface and along a periphery of the metamaterial inclusion structure. The array provides the optical magnetic susceptibility when illuminated by an optical signal at the optical wavelength. The optical signal has a magnetic field component that is parallel with an interface between the first petals and the second petals.

In other embodiments of the present invention, a method of producing an optical magnetic resonance is provided. The method of providing an optical magnetic resonance comprises providing a plurality of first petals, the first petals comprising a plasmonic material that supports a surface plasmon at an optical wavelength. The method of providing an optical magnetic resonance further comprises providing a plurality of second petals, the second petals comprising a dielectric material. The second petals are interspersed with the first petals to form a metamaterial inclusion structure, wherein the first petals alternate with the second petals at a surface and along a periphery of the metamaterial inclusion structure. The method of providing an optical magnetic resonance further comprises illuminating the formed metamaterial inclusion structure with an optical signal at the optical wavelength. The optical signal has a magnetic field component that is parallel with an interface between the first petals and the second petals.

Certain embodiments of the present invention have other features that are one of in addition to and in lieu of the features described hereinabove. These and other features of the invention are detailed below with reference to the following drawings.

BRIEF DESCRIPTION OF THE DRAWINGS

The various features of the embodiments of the present invention may be more readily understood with reference to the following detailed description taken in conjunction with the accompanying drawings, where like reference numerals designate like structural elements, and in which.

DETAILED DESCRIPTION

Figure 1:
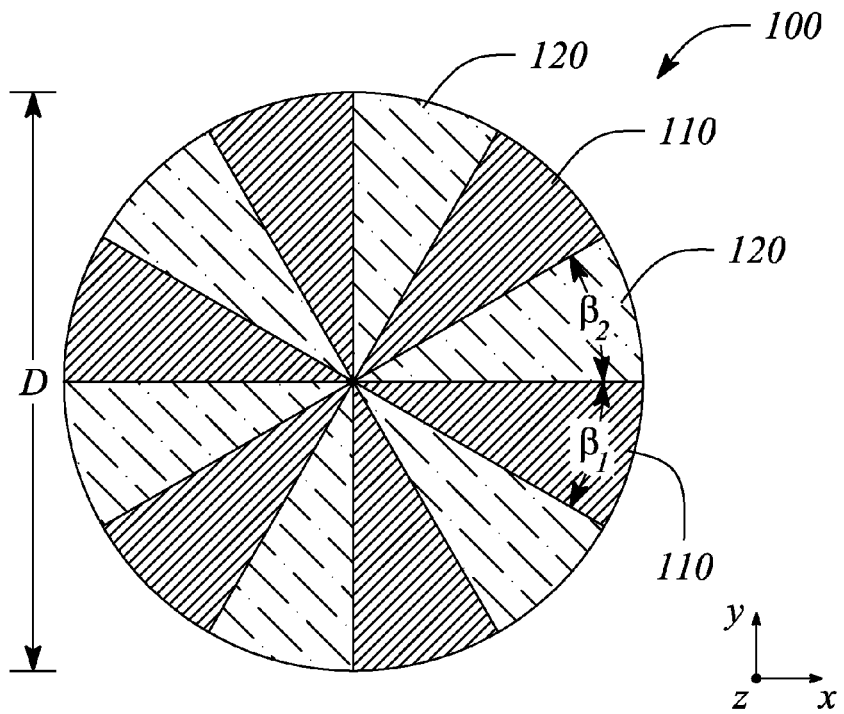
FIG. 1 illustrates a cross sectional view of a metamaterial inclusion structure, according to an embodiment of the present invention.

Embodiments of the present invention provide a magnetic response to an electromagnetic wave at optical wavelengths. In particular, various embodiments of 2-dimensional (2D) and 3-dimensional (3D) structures of the present invention may exhibit a magnetic resonance when stimulated by a transverse magnetic (TM) component of an incident optical signal. The magnetic resonance exhibited by these resonant structures may be employed to realize a metamaterial having an optical magnetic susceptibility. Such a metamaterial may exhibit a negative effective permeability in some embodiments, for example. In another example embodiment, metamaterials constructed from or including arrays of resonant structures according to the present invention may provide a negative index of refraction at optical frequencies. Negative index metamaterials (NIMs) and more general materials having negative effective permeability have a broad range of potential applications, especially in the optical domain.

By reason of their applicability to metamaterials, resonant structures according to various embodiments of the present invention are referred to herein as 'metamaterial inclusion structures'. However, while employed to describe and discuss the various embodiments of the present invention herein, the term 'metamaterial inclusion structure' is not employed by way of limitation. In particular, the term is not meant to and certainly does not limit possible applications of the disclosed resonant structures and equivalents thereof to only realizing optical metamaterials.

In various embodiments, the metamaterial inclusion structures (MISs) of the present invention are composite structures comprising a combination of a plasmonic material and a dielectric material. Specifically, the 'metamaterial inclusion structure' herein is defined to be a composite structure having a surface, wherein a portion of the surface comprises a plasmonic material that supports a surface plasmon and another portion of the surface comprises a dielectric material. The plasmonic material portion and the dielectric material portion are interspersed with one another at the surface around a periphery of the metamaterial inclusion structure. In particular, the plasmonic material portions and the dielectric material portions alternate with one another around the periphery.

The metamaterial inclusion structure may have any of a wide variety of shapes including, but not limited to, a disk, a sphere or more generally an oblate spheroid, and a dome or hemisphere. In some embodiments, the metamaterial inclusion structure has an essentially smooth surface. For example, the metamaterial inclusion structure may have a cross section that resembles a circle, an ellipse, or another similar shape having a surface that is characterized by an essentially smooth or differentiable curve. In other embodiments, the metamaterial inclusion structure may have vertices, protrusions or similar surface regions that exhibit a localized high radius of curvature. For example, the metamaterial inclusion structure may have a cross section that resembles a triangle, a rectangle, or another polygon with abrupt vertices. In yet another example, the metamaterial inclusion structure may have a cross section that combines smooth regions and regions of localized high radii of curvature (e.g., a tear-drop shape). Moreover, embodiments of the metamaterial inclusion structure of the present invention are generally small structures. For example, the metamaterial inclusion structure may be between 10 nanometers (nm) and about 10 micron (μm) in cross sectional extent or size, according to some embodiments.

The metamaterial inclusion structure interacts with a magnetic component of an incident optical signal. In particular, a TM component of the incident optical signal aligned with an interface between the plasmonic material portion and the dielectric material portion of the metamaterial inclusion structure induces a surface plasmon on the plasmonic material. The surface plasmon produces a localized, relatively high-intensity electric field. The localized, high-intensity electric field couples to adjacent plasmonic material portions across the dielectric material of the dielectric material portion. The combination of the excited surface plasmon and the coupling of the associated electric field causes the metamaterial inclusion structure to resonate (i.e., become a resonant structure) at one or more optical wavelengths of the incident optical signal.

The interaction of the TM component and the metamaterial inclusion structure that leads to resonance may be modeled by a series connection of inductors and capacitors forming a ring. In particular, the plasmonic material portion tends to exhibit an inductive reactance modeled as an inductor while the dielectric material portion acts as a capacitive reactance and may be modeled as a capacitor. Such a ring of inductors and capacitors acts as a resonator and has a resonance response at one or more frequencies. Thus, the metamaterial inclusion structure may exhibit a resonant response (e.g., may resonate) at one or more optical frequencies (or equivalently at one or more optical wavelengths) of the incident optical signal.

Herein, a 'surface plasmon' is defined as a surface wave or plasma oscillation of a free electron gas at a surface of a plasmon supporting material. The surface plasmon also may be considered as a quasiparticle representing a quantization of a plasma oscillation in a manner analogous to the representation of an electromagnetic oscillation quantization as a photon. For example, collective oscillations of a free electron gas in a surface of a metal induced by an incident electromagnetic wave at optical frequencies may be represented in terms of surface plasmons. Furthermore, characteristics of an interaction between the surface plasmons and the surface may be characterized in terms of plasmonic modes. In particular, plasmonic modes represent characteristics of surface plasmons in much the same way that electromagnetic oscillations are represented in terms of electromagnetic or optical modes.

Surface plasmons and by extension, plasmonic modes, are confined to a surface of a material that supports surface plasmons. For example, an optical signal incident from a vacuum or a dielectric material on a surface of a surface plasmon supporting material (i.e., a 'plasmonic material') may excite a surface plasmon. In some cases, the surface plasmon is essentially stationary (e.g., a standing wave) and in other cases, the surface plasmon may propagate along the surface. A surface plasmon on a surface of a plasmonic material creates a local high field region adjacent to and above (i.e., just outside of) the plasmon supporting material. The surface plasmon-created local high field region typically exhibits a field intensity that is higher than, and in some embodiments is much higher than, an average field intensity in a general vicinity of the plasmon supporting material. For example, the field intensity of the evanescent field above the surface plasmon is generally much higher than a field intensity of an electromagnetic field (e.g., optical field) used to excite the surface plasmon. As such, the region above or adjacent to the surface plasmon containing the surface plasmon-created field is referred to herein as the 'high field region'.

Plasmonic materials are materials such as, but not limited to, metals and certain organometallics that exhibit a dielectric constant having a negative value real part (i.e., for $\omega \in$ optical frequencies $\in'(\omega) < 0$ where $\in(\omega) \triangleq \in'(\omega) + j \in''(\omega)$; $j = \sqrt{-1}$.). For example, noble metals such as, but not limited to, gold (Au), silver (Ag) and copper (Cu) are materials that are known to support surface plasmons at or near optical frequencies. Thus, noble metals are examples of plasmonic materials as defined herein. Moreover, noble metals such as but not limited to gold (Au), silver (Ag) and copper (Cu) support surface plasmons at optical frequencies (or optical wavelengths). As defined herein, an optical signal is a signal comprising an electromagnetic wave having a wavelength in a range from about 100 microns ($\mu m$) to about 100 nanometers (nm). Equivalently, optical frequencies, as defined herein, range from about 3 THz to about 3 PHz.

The dielectric material of the dielectric portion may be any of a number of known dielectric materials. As used herein, the dielectric material is essentially any material that has a positive dielectric constant. In some embodiments, the dielectric material is an insulating material that exhibits low or relatively low loss at optical wavelengths. For example, the dielectric material may comprise an oxide or nitride (e.g., silicon dioxide) that is transparent or translucent at optical frequencies.

For simplicity herein, no distinction is made between various materials that may be employed to support a surface plasmon unless such distinction is necessary for proper understanding. Instead, all materials that are known to support or potentially may support a surface plasmon are generically referred to as 'plasmonic materials'. Further, as used herein, the article 'a' or 'an' is intended to have its ordinary meaning in the patent arts, namely 'one or more'. For example, 'a plasmonic element' generally means 'one or more plasmonic elements' and as such, 'the plasmonic element' means 'the plasmonic element(s)' herein. Also, any reference herein to 'top', 'bottom', 'upper', 'lower', 'up', 'down', 'left' or 'right' is not intended to be a limitation herein. Moreover, examples herein are intended to be illustrative only and are presented for discussion purposes and not by way of limitation.

Also, the optical magnetic susceptibility discussed herein is a result of a resonant feature or characteristic of the metamaterial inclusion structures, according to the present invention. As such, the optical magnetic susceptibility may be positive or negative, depend on the specific (e.g., operating) optical wavelength. Over some range of optical frequencies, the optical magnetic susceptibility may be less than minus one (−1). An optical magnetic susceptibility of less than '−1' provides a negative effective permeability.

Figure 2:
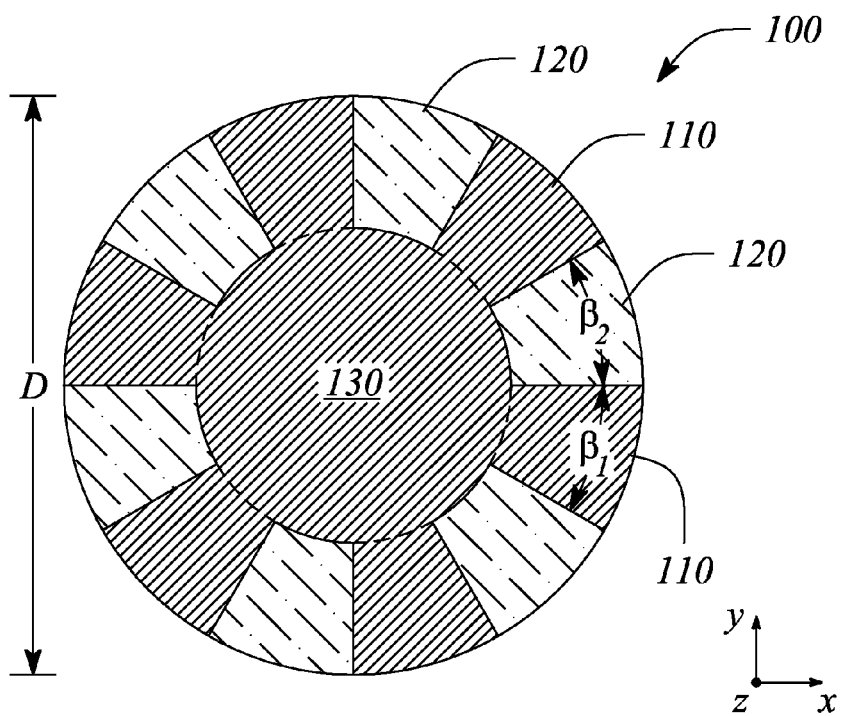
FIG. 2 illustrates a cross sectional view of a metamaterial inclusion structure, according to another embodiment of the present invention.

FIG. 1 illustrates a cross sectional view of a metamaterial inclusion structure 100, according to an embodiment of the present invention. FIG. 2 illustrates a cross sectional view of a metamaterial inclusion structure 100, according to another embodiment of the present invention. The metamaterial inclusion structure 100 supports magnetic resonance at optical frequencies. In particular, when illuminated by an optical signal, the metamaterial inclusion structure interacts with a magnetic field component of the optical signal. At one or more wavelengths 2, the interaction may produce a magnetic response of the metamaterial inclusion structure 100 to the optical signal. In some instances, the magnetic response is magnetic resonance. The magnetic resonance, in turn, may produce a positive or negative effective magnetic susceptibility (i.e., optical magnetic susceptibility) and may produce negative effective permeability when the metamaterial inclusion structure 100 is employed as an inclusion in or constituent element of a metamaterial.

In some embodiments, a size of the metamaterial inclusion structure 100 is less than about a length of the optical wavelength $\lambda$ of the illuminating optical signal. In some embodiments, the size is much less (e.g., $<\frac{1}{10}$) than the optical wavelength $\lambda$. Typical sizes of the metamaterial inclusion structure 100 in a cross section plane that includes a transverse electric (TE) field component of the incident optical signal may range from about less than 1 nm to 10 $\mu m$, for example. For example, when the metamaterial inclusion structure 100 has a circular cross section as illustrated in FIGS. 1 and 2, a diameter D of the metamaterial inclusion structure 100 may be between about 100 nm to about 10 $\mu m$, in some exemplary embodiments.

The metamaterial inclusion structure 100 comprises a plurality of first petals 110. The first petals 110 are elements or segments of a material at a surface of and arranged along a periphery of the metamaterial inclusion structure 100. Individual first petals 110 are spaced apart from one another around the periphery of the metamaterial inclusion structure 100. In some embodiments, the first petals 110 are characterized by an angle $\beta$ (e.g., $\beta_1$ in FIGS. 1 and 2); and a portion of the periphery occupied by an individual first petal 110 is termed an angular portion.

For example, as illustrated in FIG. 1, the first petals 110 comprise structures that extend radially from a central axis to a peripheral surface of the metamaterial inclusion structure 100. The central axis (e.g., z-axis) of the metamaterial inclusion structure 100 illustrated in FIG. 1 is oriented perpendicular to a plane of the illustrated cross section (i.e., the z-axis is perpendicular to a plane of the paper).

In some embodiments, all of the first petals 110 are essentially equal in size. In other words, all of the first petals 110 occupy equivalent angular portions of the periphery. For example, each of the first petals 110 illustrated in FIG. 1 occupies an angular extent of the periphery equal to angle $\beta_1$ (e.g., 30 degrees). In other embodiments, an individual first petal 110 may differ in size (e.g., have a different angle $\beta_1$) than one or more other first petals 110 of the metamaterial inclusion structure 100.

The first petals 110 comprise a plasmonic material. In particular, the plasmonic material is a material that supports a surface plasmon when illuminated by an optical signal, as defined above. Equivalently, as defined above, the plasmonic material is any material that has a dielectric constant $\in$ with a negative real part $\in'$ at optical frequencies. For example, the plasmonic material may comprise a noble metal such as, but not limited to, silver (Ag), gold (Au), or copper (Cu). Silver supports a surface plasmon for optical wavelengths in the visible and near infrared (NIR) range (e.g., about $\lambda=1.5$ μm), for example.

The metamaterial inclusion structure 100 illustrated in FIG. 1 further comprises a plurality of second petals 120. The second petals 120 are interspersed with the first petals 110 at the surface and along the periphery of the metamaterial inclusion structure 110. In particular, the second petals 120 and the first petals 110 alternate with one another at the surface and along the periphery. For example, individual second petals 120 may essentially fill a space between adjacent pairs of first petals 110. In some embodiments, the second petals 120 are characterized by an angle $\beta_2$ and a portion of the periphery occupied by an individual second petal 120 is termed an angular portion.

For example, as illustrated in FIG. 1, the second petals 120 comprise structures that extend radially from a central axis (e.g., z-axis) to a peripheral surface of the metamaterial inclusion structure 100. As such, the second petals 120 are between the first petals 110, as illustrated. In some embodiments, all of the second petals 110 are essentially equal in size (e.g., occupy equivalent angular portions of the periphery). For example, each of the second petals 120 illustrated in FIG. 1 occupies an angular extent of the periphery equal to angle $\beta_2$ (e.g., 30 degrees). In other embodiments, an individual second petal 120 may differ in size (e.g., have a different angle $\beta_2$) than one or more other second petals 120.

In some embodiments, the first petals 110 have a width at the surface of the metamaterial inclusion structure 100 that is the same as a width of the second petals 120 (e.g., $\beta_1=\beta_2$). In other embodiments, the first petals 110 have a width at the surface of the metamaterial inclusion structure 100 that differs from a width of the second petals 120 (e.g., $\beta_1 \neq \beta_2$). In yet other embodiments, respective widths of one or both of one or more first petals 110 and one or more second petals 120 differ from respective widths of other first petals 110 and other second petals 120.

The second petals 120 comprise a dielectric material. Herein, a dielectric material is defined as any material with dielectric constant c having a positive real part $\in'$, as defined above. In general, the dielectric material is an insulator. For example, the dielectric material of the second petals 120 may comprise silicon dioxide ($SiO_2$). Other exemplary dielectric materials that may be used include, but are not limited to, silicon nitride ($Si_3N_4$), various polymers (e.g., plastics), and even certain semiconductor materials that may act as a dielectric under certain conditions.

In some embodiments, the metamaterial inclusion structure 100 further comprises a core 130. The core 130 is illustrated in conjunction with the metamaterial inclusion structure 100 embodiment of FIG. 2. In some embodiments with a core 130 (e.g., as illustrated in FIG. 2), the first petals 110 may radially extend from the core 130 and the dielectric material of the second petals 120 may essentially fill spaces between the radially extending first petals 110. In some of these embodiments, the core 130 may comprise a plasmonic material. For example, the core 130 may be made of the same material as the first petals 110. In another example, the core 130 may comprise a different plasmonic material from that of the first petals 110.

In other embodiments (not illustrated), the second petals 110 may radially extend from the core 130 and the plasmonic material of the first petals 120 may essentially fill spaces between the radially extending second petals 110. In some of these embodiments, the core 130 may comprise a dielectric material. For example, the dielectric material of the core 130 and the second petals 120 may be the same. In other embodiments, the dielectric material of the core 130 may be a different dielectric material than that of the second petals 120. In yet other embodiments, the core 130 may be essentially hollow.

In other embodiments (not illustrated), the first petals 110 may comprise a support material that is coated with a layer of plasmonic material. The support material may be any material that can support the layer of plasmonic material. For example, the support material may be a dielectric material that is coated with a layer of silver (Ag). Similarly, the core 130, when present, may be made of a support material that is coated with a plasmonic material, in some embodiments.

The first petals 110 and the second petals 120 are referred to herein as 'petals' since they may resemble petals of a flower when viewed in a cross sectional view through the metamaterial inclusion structure 100, according to some embodiments. For example, the first petals 110 and the second petals 120 illustrated in FIG. 1 have a gradually increasing width from the center to the periphery (i.e., a 'fan shape') when viewed in cross section that generally resembles a petal of certain flowers, such as a Daisy or a Vinca. Similarly, the first and second petals 110, 120 illustrated in FIG. 2 may resemble the petals of a Sunflower, which has petals arranged around and extend outward from a large central core.

Figure 3:
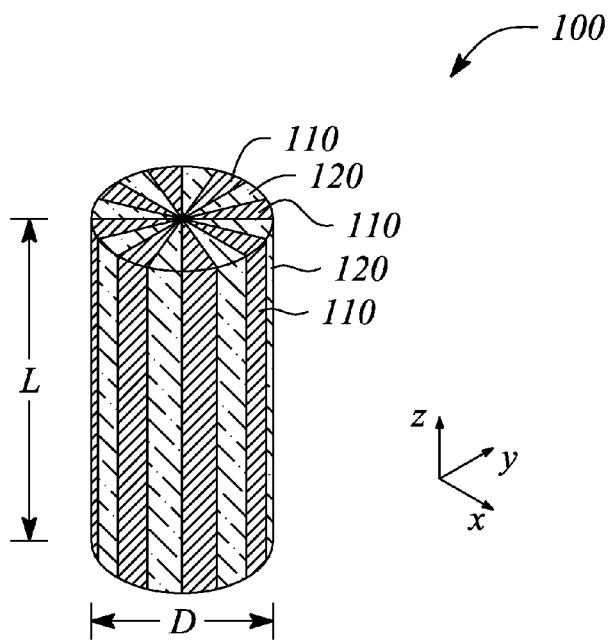
FIG. 3 illustrates a perspective view of a metamaterial inclusion structure having a cylindrical shape, according to an embodiment of the present invention.

In some embodiments, the metamaterial inclusion structure 100 has a generally cylindrical shape. FIG. 3 illustrates a perspective view of a metamaterial inclusion structure 100 having a cylindrical shape, according to an embodiment of the present invention. The cross section illustrated in FIG. 1 may be a cross section through the cylindrical metamaterial inclusion structure 100 illustrated in FIG. 3, for example.

In some embodiments (as illustrated), a length L of the cylindrically shaped metamaterial inclusion structure 100 is longer than the diameter D of the metamaterial inclusion structure 100. For example, the length L may be equal to several optical wavelengths (e.g., $L>n\lambda$ where n>1) while the diameter D may be less than the optical wavelength (e.g., $D<\lambda$). When the diameter D is much larger than the optical wavelength, the metamaterial inclusion structure 100 may be viewed as having a response that is essentially 2-dimensional (2D). Here, '2D' refers to a range of possible incident angles of the incident optical signal being confined to a 2D plane.

In other embodiments, the length L is less than the diameter D. In such embodiments, the metamaterial inclusion structure 100 may be described as a relatively circular 'disc-shaped', for example. In some of these embodiments, the disc-shaped metamaterial inclusion structure 100 may be relatively thin compared to the optical wavelength (e.g., $L<<\lambda$). Metamaterials constructed from such disc-shaped metamaterial inclusion structures 100 would exhibit a response that is essentially 3-dimensional (3D) relative to the possible incident angles of the incident optical signal used to illuminate one or both of the metamaterial inclusion structure 100 and the metamaterial in which it is employed.

Figure 4:
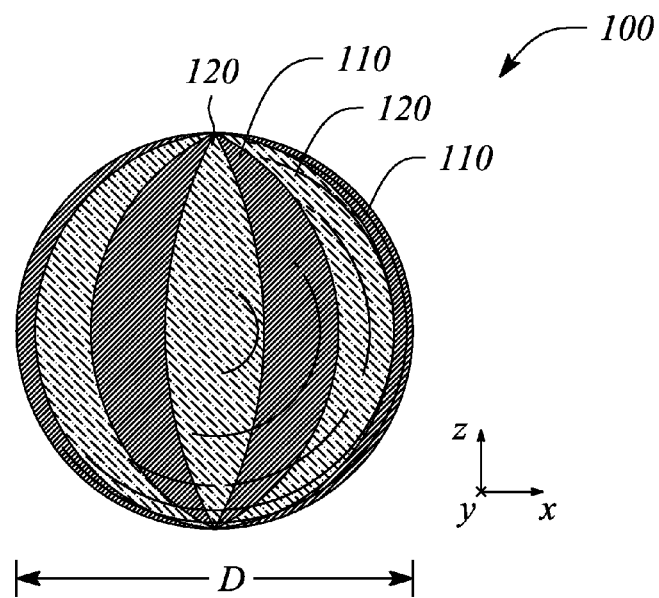
FIG. 4 illustrates a side view of a metamaterial inclusion structure having a spherical shape, according to an embodiment of the present invention.

In other embodiments, the metamaterial inclusion structure 100 may have another shape other than cylindrical or a relatively circular disc. FIG. 4 illustrates a metamaterial inclusion structure 100 having a spherical shape, according to an embodiment of the present invention. In other embodiments (not illustrated), the metamaterial inclusion structure 100 may be generally rod-like having a length with a cross section represented by a polygon (e.g., a triangle, a rectangle, an octagon, etc.). In yet other embodiments (not illustrated), the metamaterial inclusion structure 100 may be an oblate spheroid or have an essentially random shape and still be within the scope of the embodiments of the present invention.

Figure 5:
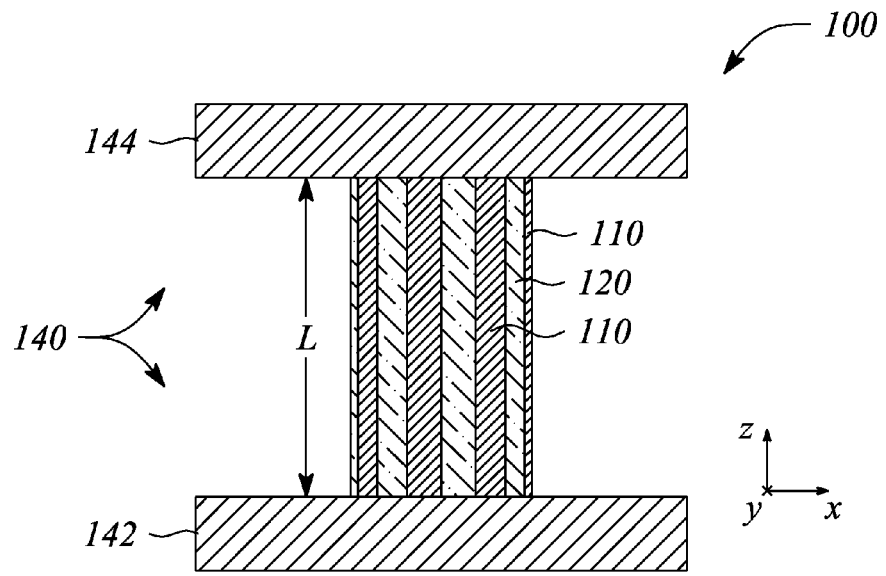
FIG. 5 illustrates a cross sectional view of a metamaterial inclusion structure with a pair of plates, according to an embodiment of the present invention.

In some embodiments, the metamaterial inclusion structure 100 further comprises a pair of plates 140. FIG. 5 illustrates a cross sectional view of a metamaterial inclusion structure 100 with a pair of plates 140, according to an embodiment of the present invention. A first plate 142 of the pair of plates 140 is located at a first end of the first petals 110 and the second petals 120. A second plate 144 of the pair of plates 140 is located at a second end of the first petals 110 and the second petals 120 that is opposite to the first end. The pair of plates 140 forms an optical waveguide structure of the optical signal.

A material or materials and a configuration of the first plate 142 and the second plate 144 are chosen in such a way that an optical waveguide structure is formed. The formed optical waveguide structure is such that it would support a transverse electric (TE) guided mode of an optical signal when not employed in conjunction with the metamaterial inclusion structure 100, in some embodiments. In particular, in some embodiments, the supported TE guided mode is an optical guided mode that provides a magnetic field component parallel to an interface between the first petals 110 and the second petals 120 of the metamaterial inclusion structure 100. In some embodiments, the material of the first plate 142 and the second plate 144 independently is selected from gold, silver, copper, $SiO_2$, $Si_3N_4$, Si, or another similar material used for optical waveguides.

In yet other embodiments (not illustrated), the metamaterial inclusion structure further comprises a dielectric slab that embeds an element comprising the first petals and the second petals. In some such embodiments, the dielectric slab may act as an optical waveguide that provides interface-parallel magnetic field component. In yet other embodiments (not illustrated), the metamaterial inclusion structure may comprise both of the dielectric slab and the pair of plates, the combination thereof providing the optical waveguide.

Figure 6A:
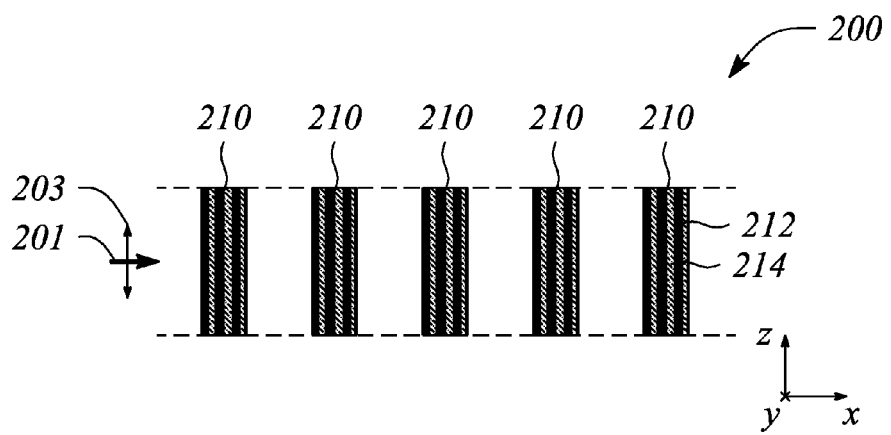
FIGS. 6A and 6B illustrate a side view and a cross section, respectively, of a metamaterial, according to an embodiment of the present invention.
Figure 6B:
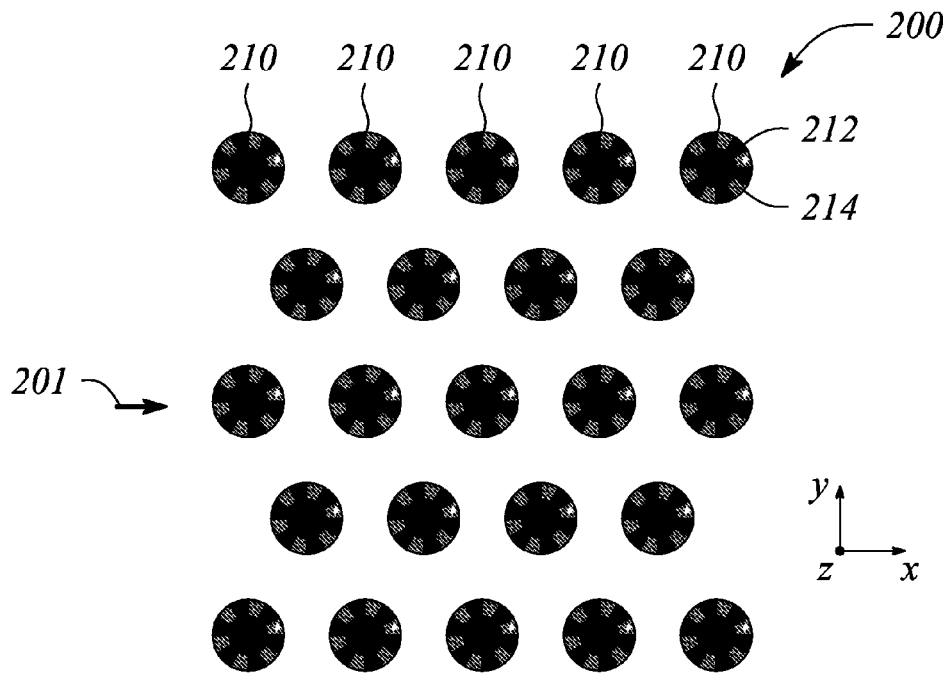

FIG. 6A illustrates a side view and FIG. 6B illustrates a cross sectional top view of a metamaterial 200, according to an embodiment of the present invention. As illustrated in FIGS. 6A and 6B, an optical signal 201 having a transverse magnetic (TM) field component 203 aligned with a z-axis of a Cartesian coordinate system illuminates the metamaterial 200. Further, the optical signal 201 is illustrated as propagating in an x-direction (i.e., along a positive x-axis). For example, in FIG. 6A, the TM field component 203 is illustrated as pointing toward a top of the figure, while in FIG. 6B, the TM field component (not illustrated in FIG. 6B) is directed out of a plane of the figure. The optical signal 201 that illuminates the metamaterial 200 is propagating from left to right, as illustrated by way of example.

The metamaterial 200 comprises a plurality of metamaterial inclusion structures 210. Individual metamaterial inclusion structures 210 of the plurality are arranged in an array. In some embodiments, the array is a regular or periodic array in which the metamaterial inclusion structures 210 are arranged and spaced apart from one another in regular or periodic manner. The periodic spacing may be periodic in 1-dimension, 2-dimensions or 3-dimensions. In other embodiments, the array is a random array where an arrangement and spacing of the metamaterial inclusion structures 210 is or essentially approximates a random distribution. In yet other embodiments, the arrangement and spacing of the metamaterial inclusion structures 210 in the array are a combination of random and periodic. As such, the term 'array' as used herein is defined as explicitly including both assemblages of elements that are one or both of periodically spaced and randomly spaced.

A metamaterial inclusion structure 210 comprises a plurality of first petals 212 and a plurality of second petals 214. The second petals 214 are interspersed with the first petals 212 such that the first and second petals 212, 214 alternate at a surface and along a periphery of the metamaterial inclusion structure 210. The first petals 212 comprise a plasmonic material that supports a surface plasmon at an optical wavelength. The second petals 214 comprise a dielectric material. In some embodiments, the metamaterial inclusion structures 210 are essentially similar to the metamaterial inclusion structures 100, described above.

Interfaces between the first and second petals 212, 214 are oriented parallel with the TM field component (i.e., parallel to the z-axis) as illustrated in FIGS. 6A and 6B. For one or more optical wavelengths, the metamaterial inclusion structures 210 become resonant when the TM field 203 component is essentially parallel with the interfaces (as in FIGS. 6A and 6B). At the one or more optical wavelengths, the resonance may result in the metamaterial 200 exhibiting one or more of an optical magnetic susceptibility, a negative permeability and a negative index of refraction.

Figure 7:
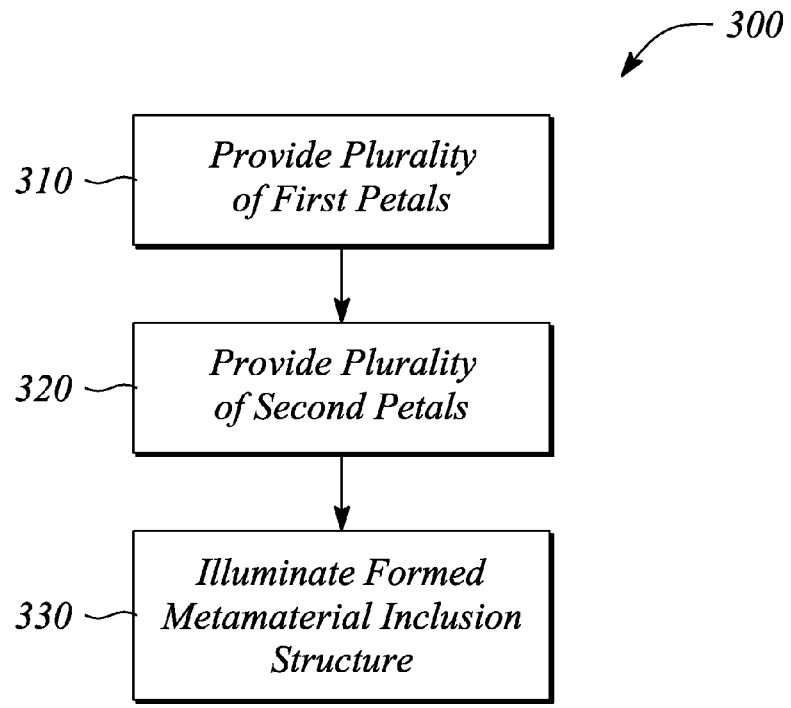
FIG. 7 illustrates a flow chart of a method of producing an optical magnetic resonance, according to an embodiment of the present invention.

FIG. 7 illustrates a flow chart of a method 300 of producing an optical magnetic resonance, according to an embodiment of the present invention. The method 300 of producing an optical magnetic resonance comprises providing 310 a plurality of first petals. The first petals comprise a plasmonic material that supports a surface plasmon at an optical wavelength. In some embodiments, the first petals may be essentially similar to the first petals 110 described above with respect to the metamaterial inclusion structure 100.

The method 300 of producing an optical magnetic resonance further comprises providing 320 a plurality of second petals, wherein the second petals comprise a dielectric material. Providing 310 and 320 comprise interspersing the second petals with the first petals to form a metamaterial inclusion structure. As such, the first petals alternate with the second petals at a surface and along a periphery of the metamaterial inclusion structure formed by the first and second petals. In some embodiments, the second petals are essentially similar to the second petals 120 described above with respect to the metamaterial inclusion structure 100.

The method 300 of producing an optical magnetic resonance further comprises illuminating 330 the formed metamaterial inclusion structure with an optical signal at the optical wavelength. The optical signal has a magnetic field component that is substantially parallel with an interface between the first petals and the second petals of the metamaterial inclusion structure. By 'substantially parallel' it is meant that a magnetic field component is approximately aligned with or parallel to a plane of the interface. For example, the interface may be oriented along a z-axis and a linearly polarized optical signal may be employed for illuminating 330 the metamaterial inclusion structure. If a transverse magnetic (TM) field component of the linearly polarized optical signal is aligned with the z-axis, the magnetic field component is substantially aligned. When substantially aligned, the metamaterial inclusion structure may exhibit a resonance under the influence of the illuminating 330 optical signal. In another example, a circularly polarized optical signal, or a linearly polarized optical signal with a rotatable polarization, may be employed for illuminating 330 the metamaterial inclusion structure. When the magnetic field component of the optical signal rotates around to and becomes aligned with the interface between the first petals and the second petals, the magnetic field component is substantially aligned and the metamaterial inclusion structure may exhibit a resonance. The resonance will be strongest when the magnetic field component is exactly aligned with the interface and will decrease as the magnetic field component rotates away from exact alignment.

In some embodiments (not illustrated), the formed metamaterial inclusion structure has one or more of a cylindrical shape and a spherical shape. In some of these embodiments, the first petals and the second petals extend radially from a central axis of either the cylindrical shape or the spherical shape such that the dielectric material of the second petals essentially fills spaces between the radially extending first petals. In some embodiments, the formed metamaterial inclusion structure is similar to any of the metamaterial inclusion structure 100 embodiments described above.

In some embodiments (not illustrated), providing 310 the plurality of first petals and providing 320 the plurality of second petals produce the first petals that have a width that differs from a width of the second petals at the metamaterial inclusion structure surface. In some embodiments (not illustrated), the method of producing an optical magnetic resonance further comprises arranging a plurality of the formed metamaterial inclusion structures in an array. In various embodiments, the array may provides a metamaterial having one or more of an optical magnetic susceptibility, a negative permeability, and a negative index of refraction when illuminated by the optical signal at the optical wavelength. In some embodiments, the metamaterial provided by arranging the structures in an array is similar to the metamaterial 200 described above.

Thus, there have been described embodiments of a metamaterial inclusion structure, a metamaterial using the inclusion structure, and a method of producing an optical magnetic resonance that employ a composite structure of plasmonic and dielectric materials. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A metamaterial inclusion structure that supports a magnetic resonance at optical frequencies comprising:
   a plurality of first petals, the first petals comprising a plasmonic material and having a width that increases from a center to a periphery of the metamaterial inclusion structure; and
   a plurality of second petals, the second petals comprising a dielectric material, the second petals being interspersed with the first petals, such that the second petals alternate with the first petals at a surface and along a periphery of the metamaterial inclusion structure, the second petals having a width that increases from a center to a periphery of the metamaterial inclusion structure,
   wherein the metamaterial inclusion structure exhibits the magnetic resonance when illuminated by an optical signal at an optical wavelength, the optical signal having a magnetic field component that is parallel with an interface between the first petals and the second petals.

2. The metamaterial inclusion structure of claim 1, wherein a cross sectional extent of the metamaterial inclusion structure is less than a length of the optical wavelength.

3. The metamaterial inclusion structure of claim 1 having a cylindrical shape, wherein the periphery is a circumference of the cylindrical shape, the first petals and the second petals alternating around the circumference.

4. The metamaterial inclusion structure of claim 3, wherein the cylindrical shape has a length that is greater than a diameter of the cylindrical shape.

5. The metamaterial inclusion structure of claim 1 having a spherical shape, wherein the periphery is a circumference of the spherical shape, the first petals and the second petals alternating around the circumference.

6. The metamaterial inclusion structure of claim 1, wherein the first petals and the second petals extend radially from a central axis of the metamaterial inclusion structure, and wherein the dielectric material of the second petals essentially fills spaces between the first petals.

7. The metamaterial inclusion structure of claim 1, further comprising a core of the plasmonic material, the first petals extending radially from the core, the dielectric material of the second petals filling spaces between the radially extending first petals.

8. The metamaterial inclusion structure of claim 1, wherein the first petals have a width that differs from a width of the second petals at the metamaterial inclusion structure surface.

9. The metamaterial inclusion structure of claim 1, wherein the plasmonic material is a noble metal.

10. The metamaterial inclusion structure of claim 1 used in an array, the array comprising a plurality of the metamaterial inclusion structure, the array forming a metamaterial that exhibits an optical magnetic susceptibility at the optical wavelength.

11. The metamaterial inclusion structure of claim 1, further comprising:
   a first plate, the first plate being located at a first end of the first petals and the second petals, the first plate comprising an electrically conductive material; and
   a second plate, the second plate being located at a second end of the first petals and the second petals opposite the first end, the second plate comprising an electrically conductive material,
   wherein the first plate and the second plate form an optical waveguide structure for the optical signal.

12. The metamaterial inclusion structure of claim 1 used in an optical metamaterial, the optical metamaterial comprising a plurality of the metamaterial inclusion structure, the optical metamaterial having an optical magnetic susceptibility at the optical wavelength.

13. An optical metamaterial exhibiting an optical magnetic susceptibility comprising:
   a plurality of metamaterial inclusion structures arranged in an array, a metamaterial inclusion structure of the plurality comprising:
   a plurality of first petals, the first petals comprising a plasmonic material that supports a surface plasmon at an optical wavelength and having a width that increases from a center to a periphery of the metamaterial inclusion structure; and
   a plurality of second petals, the second petals comprising a dielectric material, the second petals being interspersed with the first petals such that the first petals and the second petals alternate at a surface and along a periphery of the metamaterial inclusion structure, the second petals having a width that increases from a center to a periphery of the metamaterial inclusion structure,
   wherein the array provides the optical magnetic susceptibility when illuminated by an optical signal at the optical wavelength, the optical signal having a magnetic field component that is parallel with an interface between the first petals and the second petals.

14. The optical metamaterial of claim 13, wherein the metamaterial inclusion structures have a cylindrical shape, the first petals and the second petals extending radially from a central longitudinal axis of the cylindrical shape such that the dielectric material of the second petals essentially fills spaces between the radially extending first petals, the interface between the first petals and the second petals being parallel with the central longitudinal axis.

15. The optical metamaterial of claim 13, wherein the first petals have a width that differs from a width of the second petals at the metamaterial inclusion structure surface.

16. The optical metamaterial of claim 13, further comprising:
- a first plate, the first plate being located at a first end of the array, the first plate comprising an electrically conductive material; and
- a second plate, the second plate being located at a second end of the array opposite to the first end, the second plate comprising an electrically conductive material,
- wherein the first plate and the second plate form an optical waveguide structure for the optical signal.

17. A method of producing an optical magnetic resonance, the method comprising:
- providing a plurality of first petals, the first petals comprising a plasmonic material that supports a surface plasmon at an optical wavelength, the first petals having a width that increases from a center to a periphery of the metamaterial inclusion structure;
- providing a plurality of second petals, the second petals comprising a dielectric material, the second petals being interspersed with the first petals to form a metamaterial inclusion structure, wherein the second petals have a width that increases from a center to a periphery of the metamaterial inclusion structure, and wherein the first petals alternate with the second petals at a surface and along a periphery of the metamaterial inclusion structure; and
- illuminating the formed metamaterial inclusion structure with an optical signal at the optical wavelength, the optical signal having a magnetic field component that is parallel with an interface between the first petals and the second petals.

18. The method of producing of claim 17, wherein the formed metamaterial inclusion structure has one of a cylindrical shape and a spherical shape, the first petals and the second petals extending radially from a central axis of either the cylindrical shape or the spherical shape, the dielectric material of the second petals essentially filling spaces between the first petals.

19. The method of producing of claim 17, wherein providing the plurality of first petals and providing the plurality of second petals produce the first petals having a width that differs from a width of the second petals at the metamaterial inclusion structure surface.

20. The method of producing of claim 17, further comprising:
- forming a plurality of the metamaterial inclusion structure; and
- arranging the plurality of metamaterial inclusion structures in an array, the array providing an optical metamaterial, wherein the optical metamaterial has an optical magnetic susceptibility during illuminating with the optical signal.

* * * * *